United States Patent [19]

Britton, Jr.

[11] 3,904,959

[45] Sept. 9, 1975

[54] SWEPT FREQUENCY MEASUREMENT SYSTEM

[75] Inventor: Ralph H. Britton, Jr., Palo Alto, Calif.

[73] Assignee: Pacific Measurements, Inc., Palo Alto, Calif.

[22] Filed: Aug. 5, 1974

[21] Appl. No.: 494,821

[52] U.S. Cl............................ 324/57 SS; 324/58 B
[51] Int. Cl.² ........................................ G01R 27/00
[58] Field of Search .......... 324/57 SS, 58 B, 58.5 B

[56] References Cited
UNITED STATES PATENTS
3,409,826  11/1968  Goodman ..................... 324/57 SS Primary Examiner—Stanley T. Krawczewicz
Attorney, Agent, or Firm—Limbach, Limbach & Sutton

[57] ABSTRACT

A calibration curve for a test circuit alone is first memorized by the system and is then automatically subtracted from subsequent response measurements of a test device placed in the test circuit to give just the response characteristics caused by the test device. In one preferred embodiment, the scale factor of a sensitivity control is also memorized along with the calibration data and is used to control an attenuation circuit between the calibration memory and the circuit which subtracts the stored calibration signal from the test device measurement signal to thereby allow the display sensitivity to be changed after the calibration signal has been recorded without introduction of measurement error.

5 Claims, 12 Drawing Figures

TIMING DIAGRAM

SWEPT FREQUENCY MEASUREMENT SYSTEM

BACKGROUND OF THE INVENTION

The present invention relates to a measurement system and more particularly to a normalization circuit for a swept frequency measurement system.

In testing microwave components much time is spent making swept-frequency return and transmission-loss measurements using directional couplers and detectors. One problem in making such measurements is to eliminate the measurement characteristics due solely to the test circuit rather than to the device being tested. Previously, this has been done by making an oscilloscope display of the characteristics of the test circuit without the test device and then marking the oscilloscope display or calibration curve on the face of the display tube. Subsequent measurements made with the test device inserted in the test circuits are then visually (and approximately) corrected. This is a tedious process if accuracy at many points is needed.

In one prior art attempt to overcome this problem, the logarithm of the frequency response of the test circuit without the test device is recorded on one track of a two-track magnetic tape using FM recording techniques. The other track of the tape controls the frequency of the oscillator being used to produce the swept frequency test signal. Subsequently, the recorded calibration signal is subtracted from the frequency response signal of the test device to give a normalized output. One disadvantage of such a system is that its ability to respond to higher swept frequencies is limited by the frequency response of the magnetic tape recording portion of the apparatus. Another disadvantage is that changing the swept frequency to a different bandwidth, for example, is cumbersome. Still another and related disadvantage is that no provision is made for recording and playing back data at different sensitivity scales.

Even if the above described prior art system could be modified to operate digitally, there is still the problem that if the calibration signal is recorded at one sensitivity setting and it is later decided to display the input test signal minus the calibration signal at a different sensitivity setting or display scale factor, then it is necessary that the input signal, the memorized calibration signal, or both be attenuated or increased proportionately to give an accurate display. The most straight forward way to accomplish this would be to introduce selectivity or scaling factors only between the display unit and the memorization unit, that is, to record all calibration signals at the same scale factor and then to attenuate or increase the memorized calibration signal appropriately to compensate for a different display scale factor. This practice creates the problem that the digital memory must be quite large to accommodate all expected magnitudes of the calibration signal. Aside from the questions of expense and size, such a large memory introduces undesirable timing errors.

SUMMARY OF THE INVENTION

The above and other disadvantages of such prior art systems are overcome by the present invention of a normalization circuit for use in a system for measuring the response signal characteristics of a test device in a test circuit to a variable first signal during a predetermined period of time comprising input means for receiving an input signal generated by the test circuit alone in response to the first signal, a clock pulse generator, and means responsive to the output of the clock pulse generator for generating recurrent cycles of calibrating signals whose magnitudes increase in stepwise fashion beginning from an initial level below the highest expected level of the input signal. At a plurality of discrete sampling intervals during the time period, the magnitudes of the calibration and input signals are compared by a comparator circuit and the stepwise increase in magnitude of the calibration signal is halted when the difference between the magnitudes of the calibration signal and the input signal is within a predetermined range. A memory stores the magnitude of the halted calibration signal at each discrete interval and the calibration signal generator thereafter begins a new cycle from the initial level. Means are provided for displaying with respect to each discrete sampling interval during a subsequent time period the difference between the test device response signal characteristic to the first signal and the calibration signal value stored at that discrete interval so that the actual display represents the normalized response characteristic of the test device alone and does not include the effects of the test circuit characteristic itself.

In one preferred embodiment, the input means includes a sensitivity selector for scaling the input signal at one of a plurality of predetermined scale factors. This scaled input signal originally constitutes the test circuit response alone. In subsequent measurements, it constitutes the response of the test circuit with the inserted test device. The display means includes a logic controlled attenuation means for attenuating the stored calibration signal by a selected scale factor before the difference is taken between it and the input signal. Memory means are provided for storing a signal representative of the sensitivity scale setting during memorization of the calibration signal and for controlling the attenuation means in accordance with the stored sensitivity scale signal.

The primary application for the system of the invention is in swept-frequency measurements of microwave components. For such high frequency, microwave measurements the input means preferably includes a thermally stabilized detector and circuitry for converting the detected input signal into a small dB signal proportional to the RF level input signal which is the subject of the microwave measurement. This dB signal is passed through a high impedance differential amplifier to an offset amplifier. The stored calibration signal is subtracted from the dB input signal at this point when the system is in the INPUT-MINUS-MEMORY mode. The output of the offset amplifier is fed to a switched-gain amplifier which determines the sensitivity selection scale. The output of the switched-gain amplifier goes to an output amplifier and then to the display means, such as an X,Y recorder or a CRT.

During memorization of the calibrating signal the output of the switched-gain amplifier is also fed to a comparator which, together with the clock pulse generator, controls an analog to digital (A to D) successive approximation logic and storage unit whose output is fed through a multiplexer to a digital to analog (D to A) converter and to the input of the memory unit. The output of the D to A converter, which is the increasing calibration signal, is fed through the logic controlled attenuator to the offset amplifier. As described above, the logic controlled attenuator ensures that the calibration signal stored in the memory is properly scaled in accordance with the scale setting of the switched-gain amplifier to provide a proper normalization subtraction.

In operation, the "variable first signal" used to generate the response characteristics of the test circuit and the test device may be an alternating signal whose frequency increases in a predetermined fashion, such as linearly, for example, during the predetermined period of time. The system of the invention includes means for generating a horizontal deflection signal, i.e. a horizontal sweep signal, to the display means and this sweep signal has a repetition period corresponding to the predetermined period of time.

It is therefore an object of the present invention to provide a swept frequency measurement system in which a calibration curve is memorized and then subsequently subtracted from the instantaneous test data to provide a normalized measurement output.

It is another object of the invention to provide a swept frequency measurement system including a normalization circuit in which the scale sensitivity factor is variable after memorization of a calibrating signal without loss of accuracy.

It is still another object of the invention to provide a swept frequency measurement system with a normalization circuit in which scaled normalization data is stored in a memory and may be inversely scaled upon its extraction from the memory and prior to its subsequent subtraction from the new input test data.

The foregoing and other objectives, features and advantages of the invention will be more readily understood upon consideration of the following detailed description of certain preferred embodiments of the invention, taken in conjunction with the accompanying drawings.

DETAILED DESCRIPTION OF CERTAIN PREFERRED EMBODIMENTS

Figure 1:
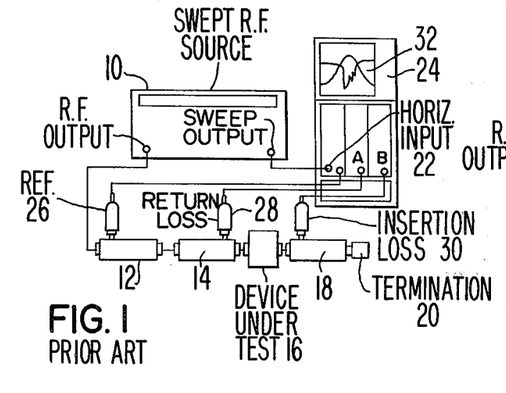
FIG. 1 is a diagrammatic illustration of a prior art swept frequency test circuit and measurement system.

Referring now more particularly to FIG. 1, a typical test circuit for measuring return and insertion losses using previously available test equipment is depicted. In order to measure the parameters of a microwave component, it is necessary to know the power incident upon it from a test oscillator. Second, the transmitted or reflected power must be measured. The measurement results are usually expressed in relative terms, since the ratio is what is important. To make measurements on a swept-frequency basis, it has been found convenient to use directional couplers in conjunction with crystal detectors to measure incident and reflected waves. This measurement technique is usually called a reflectometer system.

In FIG. 1 a swept RF source 10 provides an RF output to a first detector and 10 dB high directivity coupler 12 whose output is connected to a second detector-coupler unit 14 whose output in turn is supplied to a device under test 16. The output from the device under test 16 is fed into still a third detector-coupler set 18 which is provided with a termination 20. The swept RF source 10 also provides a sweep output signal which is connected to a horizontal input 22 of the measurement and display instrument 24. As the RF output from the source 10 is swept through a particular frequency band during a predetermined period of time, the voltage of the sweep output signal is correspondingly increased to control the horizontal deflection of a display 32 on an oscilloscope measuring instrument 24. The incident wave voltage level at the first detector-coupler unit 12 is fed by means of a probe 26 to the ratio input R of the measurement instrument 24. The reflected or return loss voltage level at the output of the second detector coupler unit 14 is supplied to an input channel A of the measurement instrument 24 through a probe 28 connected to the output of the detector-coupler set 14. The insertion loss voltage level is supplied to an input channel B of the measuring instrument 24 through a probe 30 connected to the input to the detector-coupler unit 18.

In practice, the various measurements of the ratios of the inputs A/R and B/R are made with the test device 16 removed from the circuit. The calibration curves displayed under such circumstances are then marked on the cathode ray tube screen 32 of the measuring instrument 24 with a grease pencil. The test device 16 is then re-inserted into the circuit and new measurements are made. Subsequent measurements with the test device are then visually (and approximately) corrected by subtracting the calibration curve data from the measured data.

Figure 2:
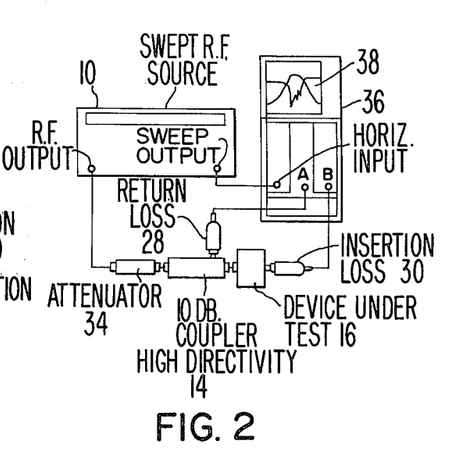
FIG. 2 is an illustrative diagram of a swept frequency test circuit and measurement system according to the present invention.

Referring now more particularly to FIG. 2, a test circuit utilizing the present invention is illustrated. In this circuit the swept RF source 10 feeds its RF output into an attenuator 34 which absorbs the wave reflected from the device 16 through the coupler detector set 14 in order to prevent re-reflection. The input channel A to the measuring instrument 36 is connected through the probe 28 to the detector-coupler 14. The input channel B to the measuring device 36 is connected through the probe 30 directly to the device under test. Thus, in the test set-up of FIG. 2 the detector-couplers 12 and 18 and the termination 20 are eliminated from the test set-up depicted in FIG. 1.

Figure 4A:
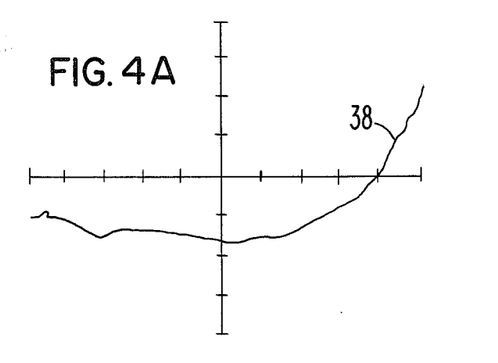
FIG. 4A is a graphical illustration of a display produced by the response characteristics of a test circuit.
Figure 4B:
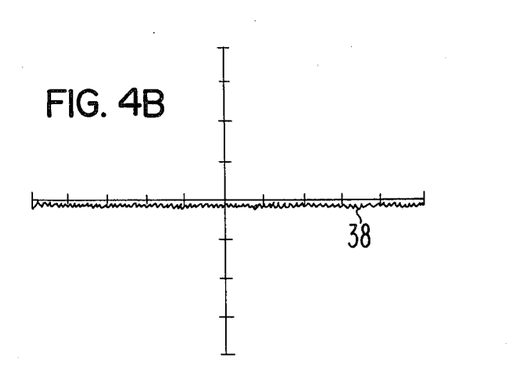
FIG. 4B is a graphical illustration of a display of the response characteristics depicted in FIG. 4A after normalization by the system of the present invention.

In operation, with the FIG. 2 test set-up, the output from the coupler 14 is shorted and the calibration return loss voltage (input A) is entered into the memory of the measurement instrument 36, as will be explained in greater detail hereinafter. Thereafter the coupler 30 is connected directly to the output of the coupler 14 and the calibration insertion loss voltage (input B) is entered into a separate memory of the measurement instrument 36. The test device 16 is then re-inserted between the detector-coupler 14 and the probe 30 and test measurements are again made. To normalize the system, the A and B input calibration signals entered into the separate memories are automatically substracted from the A and B input signals obtained with the test device 16 inserted in the circuit before the results are displayed on the screen 38 of the measurement instrument. This process is illustrated in FIGS. 4A and 4B in which the display 38 in FIG. 4A represents the test circuit response without the test device and the display 38 in FIG. 4B represents the test circuit response without the test device and with the calibration signal automatically subtracted out.

Figure 3:
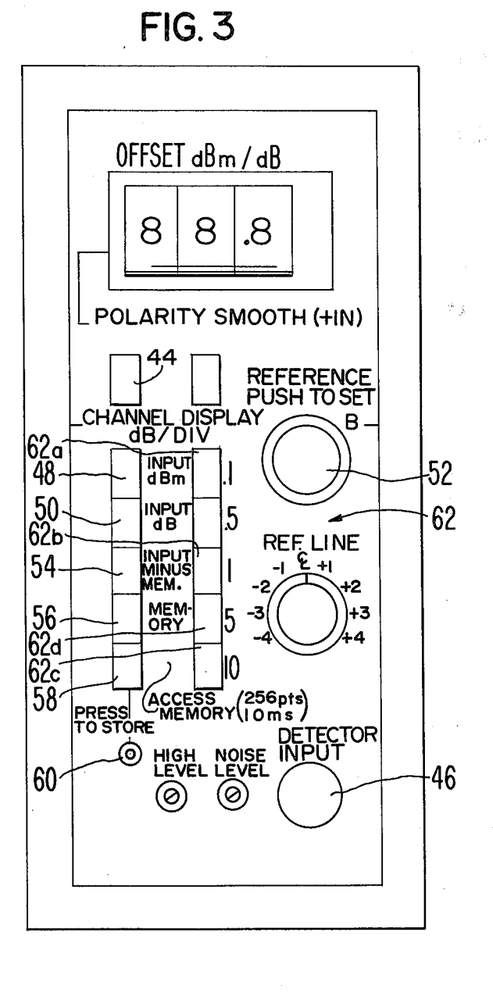
FIG. 3 is a diagrammatic view of the controls for the measurement system according to a first embodiment of the invention.

Referring now more particularly to FIG. 3, the control panel 40 of one of the channels A or B of the instrument 36 is illustrated in greater detail. The OFFSET-dBm/dB switches 42 and the POLARITY switch 44 permit the input signal fed through an input socket 46 to be offset to a null on a reference line. The amount and polarity of the offset voltage required to achieve a null can be directly read from the digits on the OFFSET switch 42 and the position of the POLARITY switch. The reading obtained is an indication of the difference in dB between the signal and the reference. The INPUT dBm and INPUT dB pushbutton switches 48 and 50, respectively, determine the relative scale of measurement for the input signal. Thus, for example, if the INPUT dBm button switch 48 is used (0 dBm reference) and an offset of "−12 dB" nulls the signal, the signal level is just -12 dBm.

As just stated by way of example, the pushbutton switch 48 displays the input signal with 0 dBm as the reference level. The INPUT dB pushbutton switch 50, however, displays the input signal with the reference level set by a REFERENCE knob 52 which must be pushed in to engage the control. The pushbutton switch 54 entitled INPUT MINUS MEMORY displays the input signal supplied to socket 46 with the contents of the memory (in dB) subtracted. This process will be explained in greater detail hereinafter. The pushbutton switch 56 entitled MEMORY displays the contents of the memory without regard to any other input signal to the instrument 36. The pushbutton switch 58 entitled ACCESS MEMORY and the pushbutton switch 60 entitled PRESS TO STORE are electrically interlocked so that the PRESS TO STORE switch 60 is inoperative unless the ACCESS MEMORY button is also depressed. When the ACCESS MEMORY switch 58 is pressed, the trace on any part or all of the CRT screen 38 may be recorded. The dB/DIV switches 62 labelled ".1", ".5", "1", "5" and "10" select the sensitivity scale or resolution of the display 38. The numbers referred to indicate the scale for each major vertical division on the CRT screen.

In operation, the calibration trace, that is the trace made without the test device inserted in the measuring circuit, is made by setting the OFFSET switch to 00.0 and centering the trace on the screen 38 using the REFERENCE control 52. The sensitivity is increased by means of the switches 62 so that the calibration trace fills the screen 38 but does not go beyond the limits of the screen (FIG. 4A). When the PRESS TO STORE button 60 is depressed together with the ACCESS MEMORY button 58, the trace will momentarily collapse into a straight line and then return to its previous form. This indicates that the trace has been recorded in the memory. To check the contents of the memory, the MEMORY button 56 is then depressed and the same or nearly the same curve as the calibration curve will be displayed. When the INPUT MINUS MEMORY button 54 is pressed, a straight line (FIG. 4B) should result as the calibration curve recorded is subtracted from the signal supplied to the input socket 46. When subsequent measurements are made on an RF device 16, the data displayed will be just the characteristics of the device 16 since the apparent calibration curve is just a straight line corresponding to the reference line. If the OFFSET switch 42 is used, its dial will read the loss or gain of the device 16 under test.

Since it is a feature of this invention to record the sensitivity of the display (dB/DIV scale) at the time data is stored in the memory, the display of the memory contents will be at the sensitivity recorded. Therefore, the display will be unaffected by the particular dB/DIV button 62 selected during subsequent displays. This feature will be explained in greater detail hereinafter.

Figure 5:
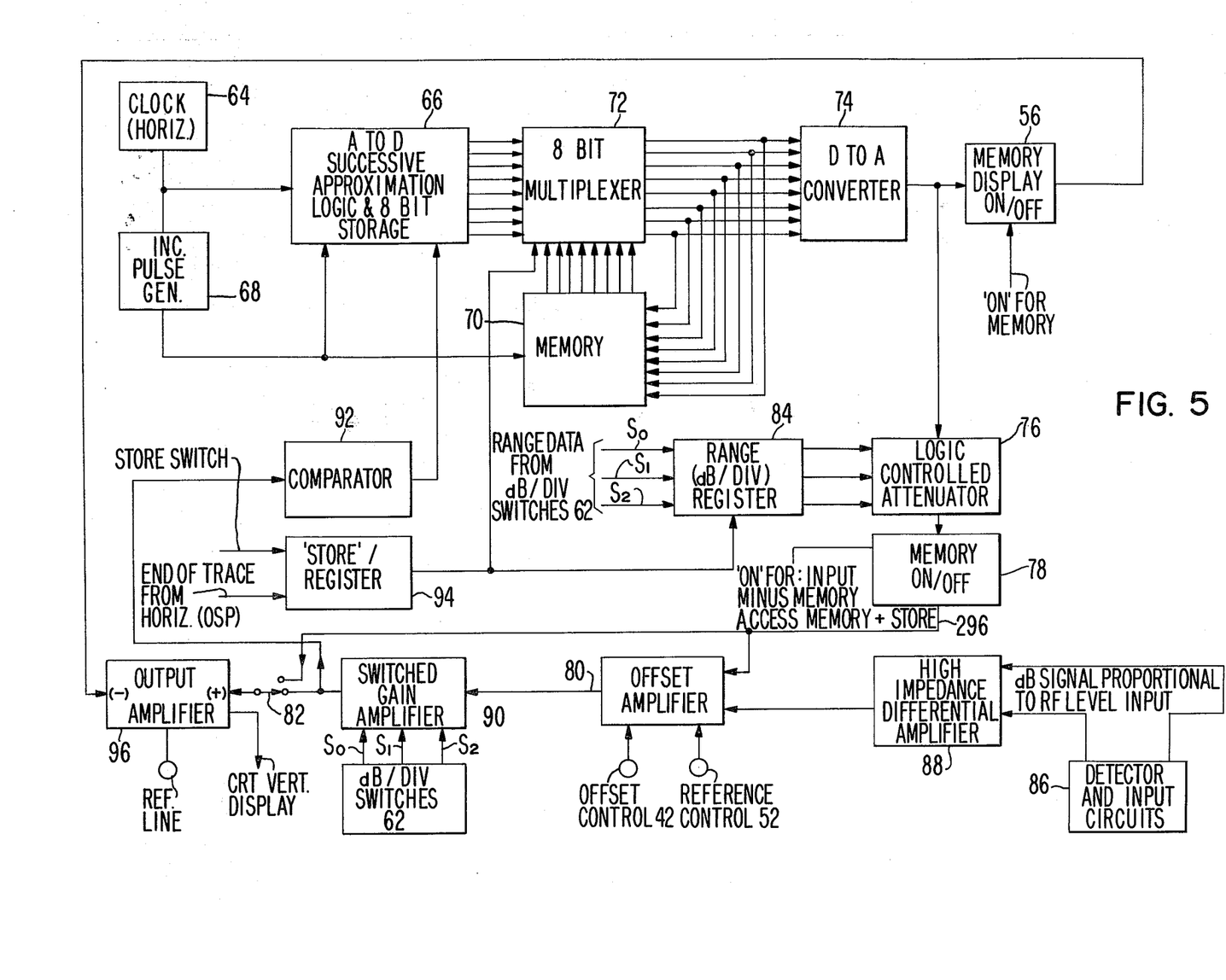
FIG. 5 is a block diagram of the preferred embodiment of the invention.

Referring now more particularly to FIG. 5, the memorization circuit is shown in block form. A clock pulse generator 64 supplies a stream of timed pulses to an analog to digital (A to D) successive approximation logic and storage unit 66 and to an increment pulse generator 68. The increment pulse generator 68 generates an INC pulse whenever it is required for the memory unit 70 to take a new reading or supply new data. During the horizontal sweep these INC pulses are more or less evenly spaced with the intervals between pulses being proportional to the time period required for the horizontal sweep of the display 38. (See FIG. 8). This is accomplished either by triggering the INC pulse generator from the "sweep output" of the RF source 10 or by controlling the RF source sweep from the instrument 36. The end of a horizontal sweep (OSP) pulse is supplied from the horizontal display circuit (not shown) of the instrument 36. The purpose of these various units is to permit the memory unit 70 to record and playback data in synchronism with the horizontal sweep.

The multichannel output from the approximation logic circuit 66 is connected through an 8-bit multiplexer 72 to a digital to analog (D to A) converter 74 and to the multichannel input of a memory unit 70. As will be explained in greater detail hereinafter, the memory unit 70 includes eight 256 bit shift registers in this embodiment. The multichannel output from the memory unit 70 is connected to a second set of inputs to the multiplexer 72.

The analog output from the D to A converter 74, which represents the calibration signal, is supplied through a logic controlled attenuator 76 and an on-off memory switch 78 to one input of an offset amplifier 80 and to one terminal of a multi-terminal switch 82. The selectivity scale factor of the switch unit 62 is coded in binary signal form (signals labelled $S_0$, $S_1$ and $S_2$) and is fed to a range register 84 which supplies control signals to the logic controlled attenuator 76. An input signal from the test circuit is fed through isolated detector and input circuits 86 and is converted into a dB signal proportional to the RF level input. This dB signal is fed to a high impedance differential amplifier 88 which provides the means of transferring the signal from the isolated detector circuit 86 to a ground-referenced signal. It has a high input impedance and a good common-mode rejection. Parasitic signals appearing on the bench ground to which the detector is connected are rejected by this arrangement.

The output of the differential amplifier 88 is supplied to another input of the offset amplifier 80. Still other inputs to the offset amplifier are from the offset and reference controls 42 and 52, respectively. These controls supply current corresponding to their respective settings. The output of the offset amplifier, which essentially sums these various signals, is supplied to the input of a switched-gain amplifier 90 whose gain is controlled by the dB/DIV switches 62. The output of the switched-gain amplifier 90 is supplied directly to the input of a comparator circuit 92 which controls the A to D successive approximation logic circuit 66. The output of the switched-gain amplifier 90 is also supplied to another terminal of the multi-position switch 82. The moving contact of the switch 82 is connected to the input of an output amplifier 96 whose output controls the vertical deflection of the CRT display 38.

During a cycle in which the calibration signal is recorded, the incoming signal to the input circuit 86 is the calibration data, i.e. the response of the test circuit without the test device. This signal, after conversion to dB form, is fed through the high impedance differential amplifier 88, the offset amplifier 80, the switched-gain amplifier 90 and the comparator 92 to the A to D successive approximation logic circuit 66. Under the control of the logic circuit 66, which in turn is under the control of the clock pulse generator 64, the INC pulse generator 68, and the comparator 92, a recurrent cycle of calibrating voltage signals are generated whose magnitudes increase in stepwise fashion beginning from an initial level below the highest expected level of the input calibration signal. These signals correspond to the negative of the analog data displayed prior to recording. The D to A converter 74 generates these signals in response to a binary "word" supplied to it from the logic circuit 66. This logic word is entered into the memory 70 simultaneously with the production of each calibrating signal from the D to A converter 74.

The stepwise changing calibrating signal is fed through the logic controlled attenuator 76 to the offset amplifier 80 and is added to the dB level signal, or more appropriately is subtracted since its polarity is the opposite of the polarity of the dB level input signal, and the resultant signal is fed to the comparator 92 through the switched-gain amplifier 90. With each new step in magnitude of the calibrating signal, the comparator determines whether or not its contribution exceeds the magnitude of the signal corresponding to the CRT display, i.e. whether the switched-gain amplifier 90 output is null or negative. If not, a "1" is placed in the 8-bit storage register of the memory circuit 70 and the current for that bit remains. If it is excessive, a "0" goes into the register of the memory circuit 70 and the current for that bit is dropped. When the process is complete, the sum of all the currents will be just equal to the input current within one bit, or 1/256 of the eight divisions on the CRT screen. This process is repeated for a plurality of discrete timing intervals, i.e. at each INC pulse, during the period of time required to complete one horizontal sweep across the CRT display. Thus, the location in the memory unit 70 of each memorized calibrating signal value corresponds to a particular interval along the horizontal sweep of the CRT display.

The D to A converter 74 has two modes of operation. During the record cycle, that is during the cycle in which the calibrating signal is recorded, it acts as a component of the A to D successive approximation logic 66. The multiplexer 72 connects the D to A converter 74 to the A to D successive approximation logic circuit 66. After the approximation has been completed for a given interval on the horizontal sweep, and after the comparator 92 has determined that the output of the switched-gain amplifier 90 is within a predetermined range of a reference value and has halted its stepwise increase in the calibrating signal, the data controlling the D to A converter 74 represents the equivalent of the voltage during the CRT display. Since the memory input is also connected to te D to A converter 74, when the next INC pulse arrives from the increment pulse generator 68, the binary word from the logic circuit 66 which is driving the D to A converter 74 will shift into the register of the memory unit 70. When the recording of the calibrating signal has been completed, an end of trace (OSP) pulse is supplied from the horizontal display section of the device 36 and this is fed to a "store"/register 94. The output of the store/register is fed to the multiplexer 72 and to the range register 84. With the receipt of the OSP pulse, the store/register drops its output and the multiplexer 72 connects the input of the D to A converter 74 to the output of the memory circuit 70. The D to A converter 74 will now generate a calibrating signal corresponding to the contents of the memory 70. In addition, the output of the memory is furthermore connected back to its own input through the multiplexer 72 and the stored data recirculates so that it is retained in the register of the memory unit 70.

Figure 6:
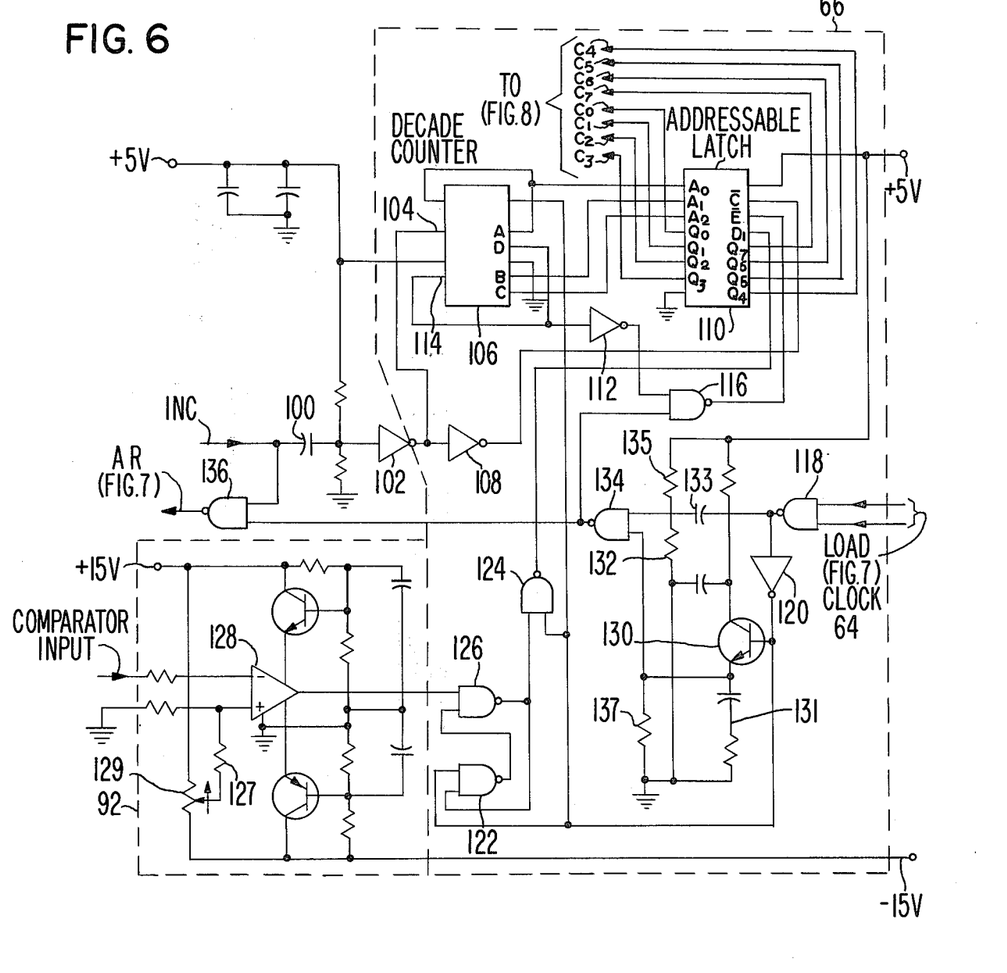
FIG. 6 is a schematic illustration of the comparator and successive approximation logic portions of the embodiment.
Figure 7:
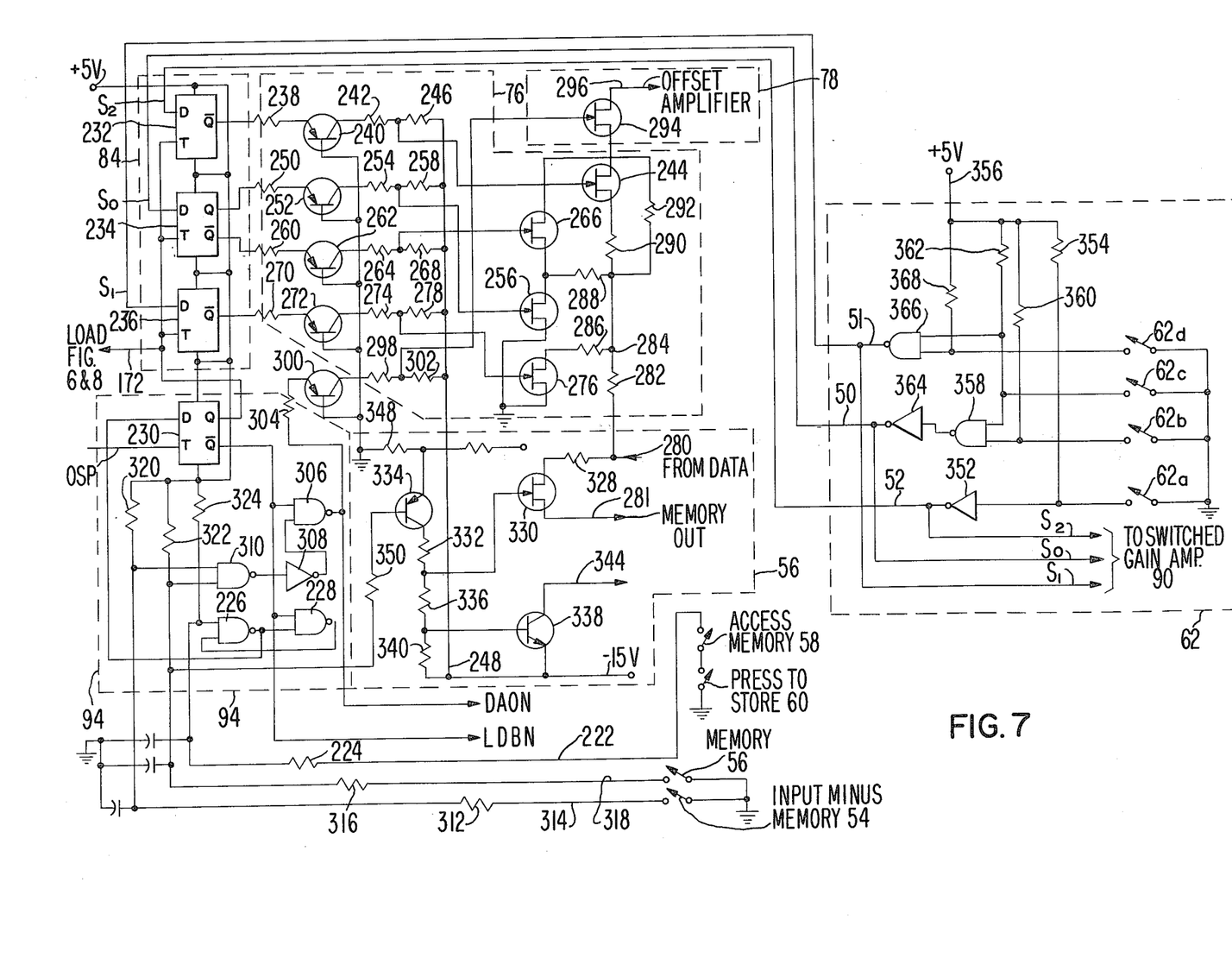
FIG. 7 is a schematic illustration of the range register and the logic controlled attenuator portions of the embodiment depicted in FIG. 5.

Referring now more particularly to FIGS. 6 and 7, certain of the units depicted in FIG. 5 in block diagram form are shown in greater detail. The successive approximation process by which the calibrating signal is generated is begun when an INC pulse comes from the increment pulse generator 68 in the horizontal unit of the device 36 to the successive approximation logic unit 66, indicated in dashed lines in FIG. 6. The INC pulse is supplied through a capacitor 100 and an inverter 102 to the reset input 104 of a binary, decade counter 106 (FIG. 6). The pulse from the inverter 102 is also fed through an inverter 108 to the not-clear ($\overline{C}$) input of an addressible latch unit 110. The effect of supplying the twice inverted INC signal to the input $\overline{C}$ is to clear the latch 110. As will be explained in greater detail hereinafter, the INC pulse also allows a delayed clock pulse to advance the shift registers within the memory circuit 70, thereby moving the last data supplied into the memory unit shift registers.

Figure 10:
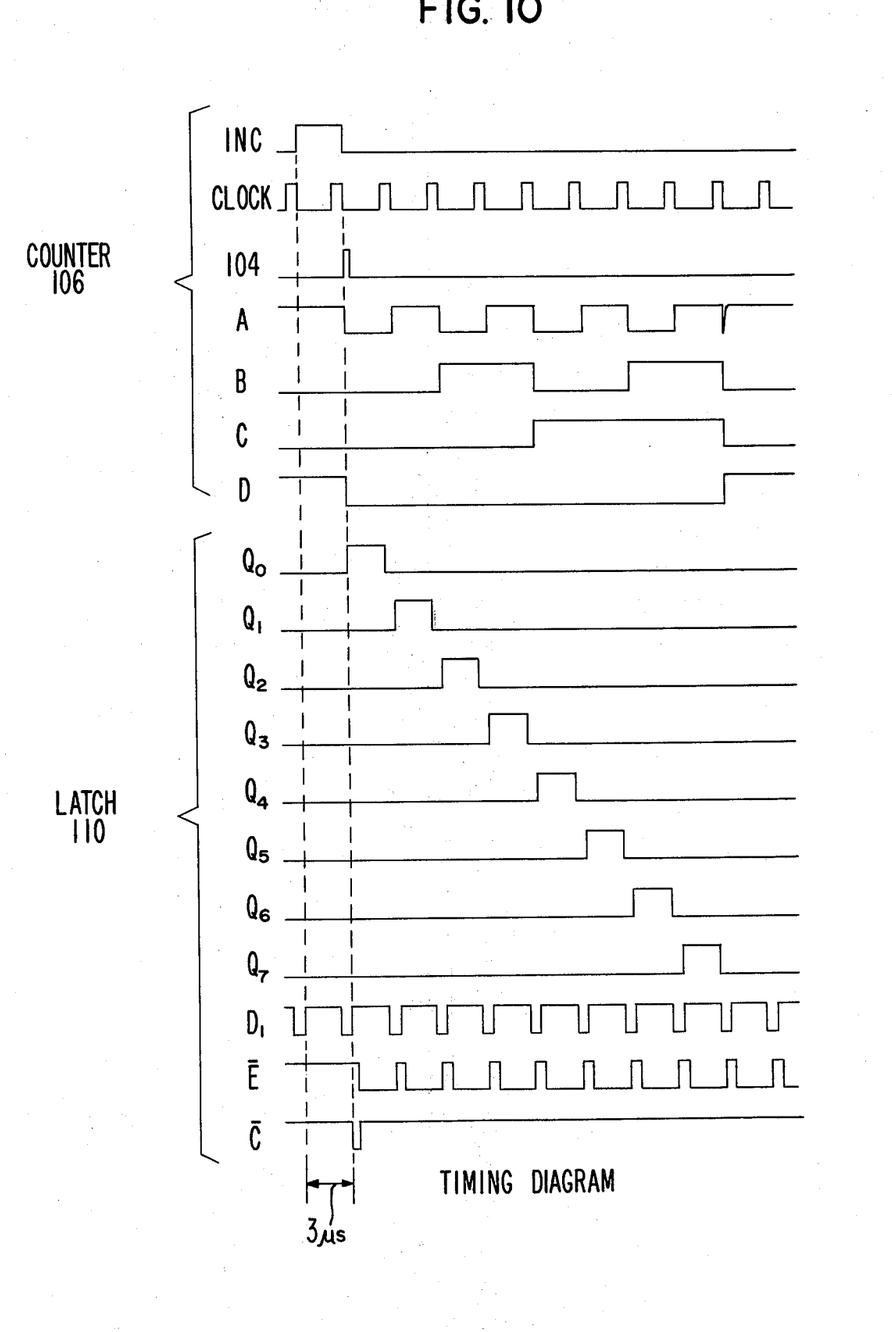

Clock pulses are supplied every three microseconds from the clock pulse generator 64 to the counter 106 and the INC pulse is synchronized to occur simultaneously with a given pulse of the clock. Thus, there will be a clock pulse negative transition approximately three microseconds after the termination of the INC pulse (See FIG. 10).

The counter 106 starts at a state of "zero", remains there for 3 microseconds, and then increments to a state "one" for 3 microseconds, continuing in this fashion to a state "seven". When it reaches state "eight", corresponding to the binary code 0001, a D output of the counter 106 goes high, or 1, which in this description means that it goes to a predetermined positive voltage, and a positive pulse signal is supplied to an input 114 of the counter 106 to cause the counter to go to a "nine" state and to hold that state. The counter outputs A, B and C, which are representative in binary code of the numbers $2^0$, $2^1$, and $2^2$, respectively, are supplied to the corresponding inputs $A_0$, $A_1$ and $A_2$ of the latch 110, respectively. Signals supplied to a $D_1$ input of the latch 110 control the state of the latch whose address is called by the signals supplied from the counter outputs A, B and C. When the counter is at the eight level, a positive pulse, or logic high, from the D output of the counter 106 is passed through an inverter 112 to become a logic low and is supplied to one input of a NAND gate 116. The output of the NAND gate 116 is a logic high, or positive pulse, and this is supplied to the disable input $\bar{E}$ of the latch 110. This pulse supplied to the disable input causes all data entered in the latch 110 to be held until the next INC pulse.

Immediately after the negative transition of the initial clock pulse, the $D_1$ input of the latch 110 is supplied with a logic high. This condition lasts for approximately 2.5 microseconds until the positive transition of the next clock pulse. The manner in which the logic 1 is supplied to the $D_1$ input of the latch 100 wil now be explained in greater detail.

The clock pulse output is connected to one input of a NAND gate 118 whose output is connected through an inverter 120 to one input of a NAND gate 122 and to an input of another NAND gate 124. The other input to the NAND gate 118 is a LOAD signal which, as will be explained in further detail, is high during the RECORD mode. The output of the NAND gate 124 is connected to the $D_1$ input of the latch 110. As is commonly known, the logic of the NAND gates is such that its output will be high (a logic 1) for all conditions of inputs other than all logic 1's. When all of a NAND gate's inputs are supplied with logic 1's its output will be a logic 0 or a low. Thus, during the RECORD mode, with the LOAD signal high, a clock pulse input to the NAND gate 118 produces a low at its output. The low is inverted by the inverter 120 to become a high which is supplied to one input of the NAND gate 124, thereby allowing its other input to take control. Its other input is the output of a NAND gate 126.

The output of the NAND gate 122 is connected to one input of the NAND gate 126 whose output is connected to the other input of the NAND gate 122 as well as the NAND gate 124. The NAND gates 122 and 126 together constitute a flip-flop. When a positive pulse or high is supplied to the one input of the NAND gate 122 by the clock pulse generator 64 the flip-flop comprised of the NAND gates 122 and 126 may thereafter be set to a 1 or high at the output of the NAND gate 126 if a low or 0 is supplied to the other input of the NAND gate 126.

The other input of the NAND gate 126 is supplied by the output of the comparator circuit 92, indicated in FIG. 6 in dashed lines. More specifically the other input of the NAND gate 126 is connected to the output of a differential amplifier 128 of the comparator unit 92. As shown in FIG. 6 and the block diagram of FIG. 5, the comparator input to the differential amplifier 128 is connected to the output of the switched-gain amplifier 90. As long as the calibrating signal supplied by the D to A converter 74 to the offset amplifier 80 is less than the dB level input signal supplied from the differential amplifier 88, a high will be supplied from the output of the comparator to the input of the NAND gate 126. As long as this input is high, the NAND gate 126 output to the input of the NAND gate 124 will remain a low. Since the NAND gate 124 is thus supplied with low and high inputs, its output will be a high which, in turn, is supplied to the $D_1$ input of the latch 110.

The result of this sequence is to cause the particular output of the latch 110 which has its address supplied by the counter 106 to go to a 1 during the first 2.5 microseconds of the clock period, and then to go to a state dependent upon the data at the comparator output. That is, the voltage in the D to A converter 74 will go to a given level for a 1 at that particular bit, and then will remain at that level if a high is supplied from the output of the comparator, indicating that the calibrating signal is less than the input signal. It will not, however, remain at that level if a low is supplied from the output of the comparator 92 but instead will drop to a given level for a 0 at that particular bit. A low from the comparator 92 indicates that the calibrating signal is equal to or exceeds the input signal. The comparator 92 thus compares the sum signal from the output of the switched-gain amplifier 90 to a reference value, in this case an adjustable value, obtained from the sliding contact of a potentiometer 129 connected between a positive and a negative voltage source. The potentiometer contact is connected through a resistor 127 to the positive input terminal of the differential amplifier 128, which is also connected to the circuit ground.

Figure 11:
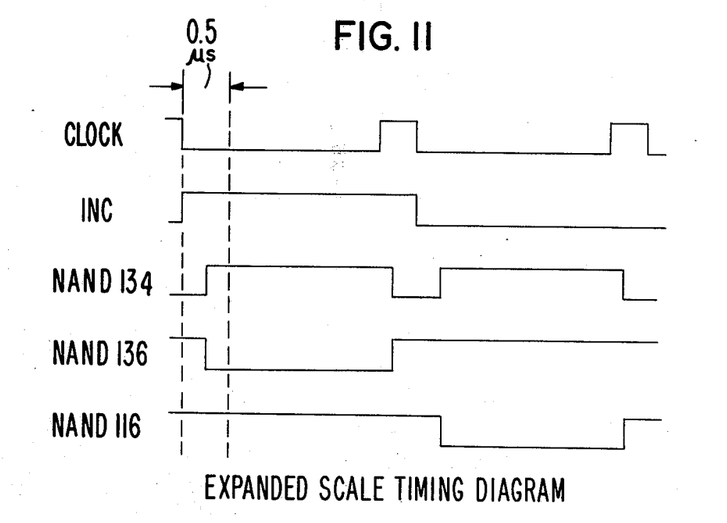

In order for data to remain in the latch 110, it is required that its disable input ($\bar{E}$) be held high during the time when the address information is changing. Since the address information changes at the negative transition of the clock pulse, a signal which is, in effect, a delayed clock pulse must be supplied to the disable input. This delayed pulse is supplied from the inverted clock pulse output from the inverter 120 which is supplied to the base of an NPN transistor 130 whose emitter output is connected to one input of a NAND gate 134. The other input of the NAND gate 134 is connected through a capacitor 133 to the output of the NAND gate 118 and to a positive voltage source through a resistor 135. This resistor 135 normally supplies a logic high to this input of the NAND gate 134. A resistor 137 is connected between the emitter of the transistor 130 and the circuit ground to normally supply a logic low to the other input to the NAND gate 134. An RC network 132 connected in parallel with the capacitor 133 and an RC network 131 connected in parallel with the resistor 137 provide the necessary delay in the clock pulse information supplied to the NAND gate 134 (See FIG. 11). The output of the NAND gate 134 is connected to the other input of the NAND gate 116 whose output is connected to the disable input $\bar{E}$ of the latch 110. The output of the NAND gate 134 is also connected to one input of a NAND gate 136 whose other input is supplied with the INC pulse.

The circuit made up of elements 120, 130, 132 and 134 supplies a delayed and inverted clock pulse to the NAND gate 116 which then disables the input $\bar{E}$ of the latch 110. Since the rising edge of this pulse occurs before the trailing edge of the INC pulse and the trailing edge of this delayed pulse follows te trailing edge of the INC pulse, it is also useful to use this delayed pulse to cause the shift registers within the memory unit 70 to shift just prior to the clearing of the latch 110, while the data at the outputs of the latch 110 is still valid. This is the purpose of the output of the NAND gate 136, referenced "AR", which is connected to each of the shift registers in the memory unit 70.

Figure 8:
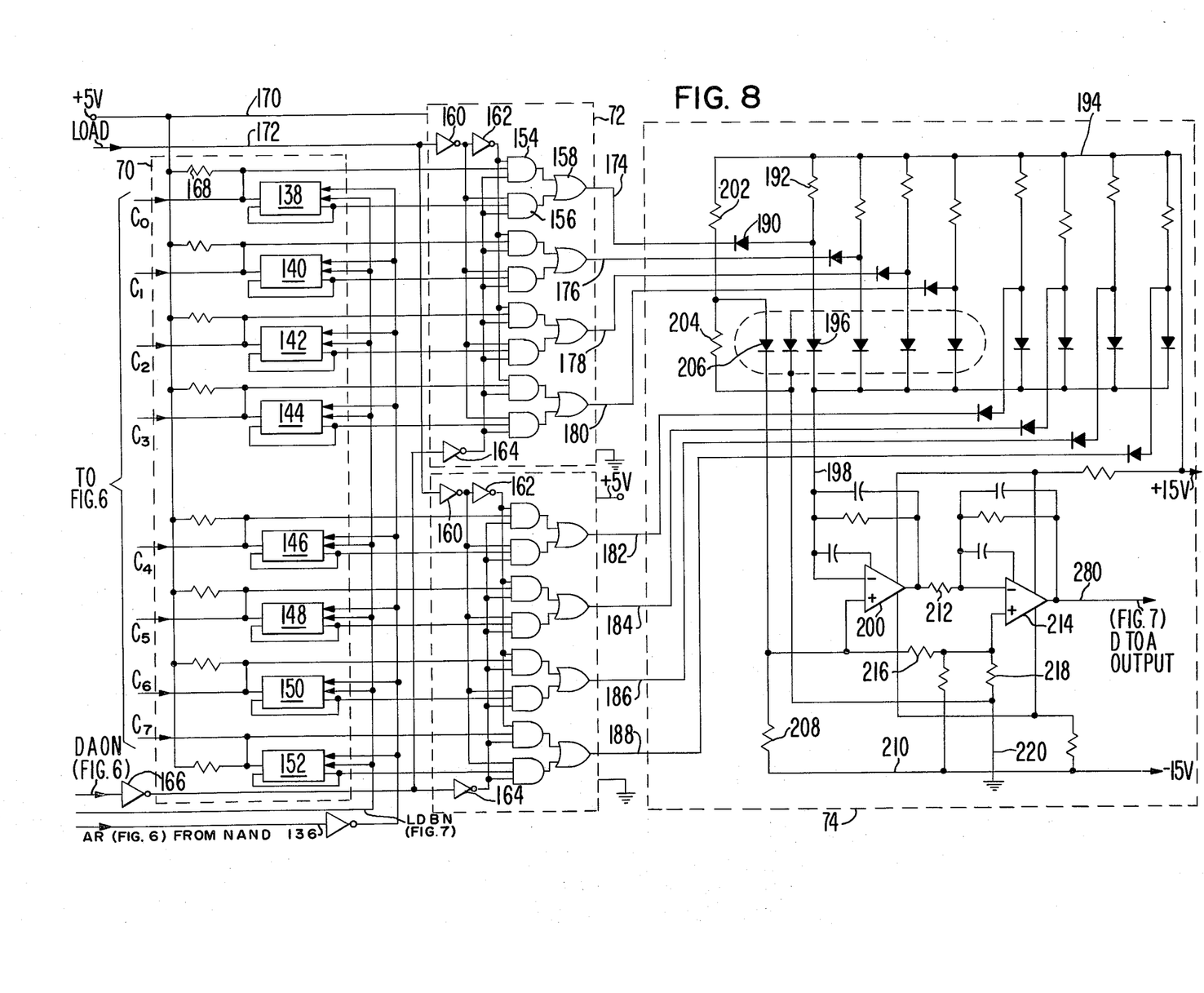
FIG. 8 is a schematic illustration of the multiplexer and digital to analog converter portions of the embodiment depicted in FIG. 5.
Figure 9:
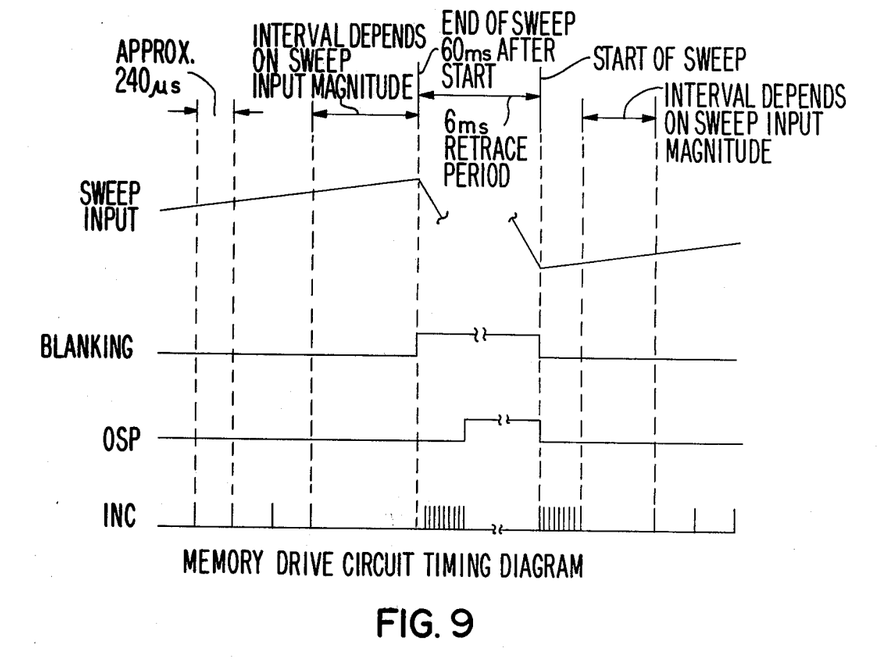
FIGS. 9–11, inclusive, are timing diagrams for use in explaining the operation of the embodiment depicted in FIG. 5.

The output data from the latch 110 is a digital code which is used to generate certain analog signals in the D to A converter 74. Referring now more particularly to FIGS. 6 and 8, the digital output data is supplied along lines $C_0$, $C_1$, $C_2$, $C_3$, $C_4$, $C_5$, $C_6$ and $C_7$ which are connected, respectively, to the outputs $Q_0$, $Q_1$, $Q_2$, $Q_3$, $Q_4$, $Q_5$, $Q_6$ and $Q_7$ of the latch 110. The lines $C_0$–$C_7$, inclusive, are connected to the memory unit 70 and through the multiplexer 72 to the D to A converter 74.

The basic operation of the memory unit 70 is that the memory input is the same as the input to the D to A converter 74. This input data is shifted into the memory each time an INC pulse comes from the INC pulse generator 68. During the RECORD cycle this data originates with the approximation logic unit 66, whereas at other times it comes from the output of the memory unit 70 itself. Thus, as described above, new data appears for the memory for recording and old data is recirculated at all other times, thereby retaining it in the memory unit 70. With reference now more particularly to FIG. 8, it can be seen that the output from the latch unit 110 on each of the lines $C_0$, $C_1$, $C_2$, $C_3$, $C_4$, $C_5$, $C_6$ and $C_7$ is supplied to the separate inputs of eight 256-bit shift registers 138, 140, 142, 144, 146, 148, 150 and 152, respectively. The outputs of each of the shift registers are recirculated to their own inputs either internally or externally so that the old data is recirculated at all times other than during recording.

The inputs $C_0$–$C_7$, inclusive, are also separately fed to separate inputs to the multiplexer unit 72. Likewise, the outputs from the shift registers 138–152, inclusive, are also fed to separate, corresponding inputs of the multiplexer unit 72. The separate inputs of the shift registers 138–152, inclusive, and the corresponding inputs to the multiplexer unit 72 are biased through separate resistors, designated generally 168, to a five volt positive voltage supply via a bus 170.

The operation of one portion of the multiplexer 72 associated with the output of one of the shift registers, for example shift register 138, will be explained in detail. It will be understood, however, that the other segments of the multiplexer unit 72 associated with the other shift registers operate in substantially the same manner. The output from the shift register 138 is fed to one input of a three input AND gate 156. The output of the AND gate 156 is fed to the input of an OR gate 158. The input from line $C_0$ which goes to the input of the shift register 138 is also fed to one input of a three input AND gate 154 whose output is connected to the other input of the OR gate 158. Another input of the AND gate 154 is connected to the output of an inverter 162 whose input is supplied from the output of a second inverter 160. The input to the inverter 160 is a LOAD line 172 which will be described in greater detail hereinafter. For the purposes of the present description, the signal on the LOAD line is high at the end of the horizontal sweep of the display 38 following the pressing of the STORE button 60 and remains high during the next sweep when the calibration signal is being recorded. At the end of that recording sweep, it falls to a low.

The output of the inverter 160 is also supplied to another input of the AND gate 156. The remaining two inputs of the AND gates 154 and 156 are connected together to the output of an inverter 164 whose input is supplied from the output of an inverter 166. It will be understood that in other embodiments the two inverters 164 and 166 may be omitted in lieu of a direct connection. Their presence is only necessitated by the fact that the particular multiplexer unit 72 described above comes ready made with the inverter 164. The input to the inverter 166 is supplied from a line referenced DAON (digital to analog "on"). The operation of the DAON line will be explained in greater detail hereinafter but for the purposes of the present description it will be understood that the signal on the DAON line is high when the instrument is operating in the MEMORY, INPUT MINUS MEMORY or RECORDING modes.

From an elementary analysis of the logic circuitry involved, it will be apparent that the output of the OR gate 158 will be supplied from the shift register 138 during the MEMORY and INPUT MINUS MEMORY modes and from the input on line $C_0$ during the RECORDING mode. This is because during the MEMORY and INPUT MINUS MEMORY modes the LOAD signal is low causing the AND gate 154 to be non-conductive. During the RECORD mode, the LOAD signal is high and the output from the inverter 160, representing a "not" high, or low, is supplied to the input of the AND gate 156 causing it to become non-conductive.

The outputs from the multiplexer 72 corresponding to the inputs $C_0$, $C_1$, $C_2$, $C_3$, $C_4$, $C_5$, $C_6$ and $C_7$, respectively, are designated for the purposes of this description as 174, 176, 178, 180, 182, 184, 186 and 188, respectively. It will be understood that these same outputs correspond to the outputs of the shift registers 138, 140, 142, 144, 146, 148, 150 and 152, respectively, during the MEMORY and INPUT MINUS MEMORY modes. It will further be understood that in binary terminology these outputs correspond to the 7th, 6th, 5th, 4th, 3rd, 2nd, 1st and 0th powers of 2, respectively.

The combination of shift registers 138–152, inclusive, may be thought of as an array whose horizontal row indices correspond to different sampling intervals during the horizontal sweep and whose combined vertical indices in a given column correspond to different voltage levels of the calibrating signal. For each interval during the horizontal sweep, corresponding to an array column, there is a single bit position in each of the eight registers 138–152, inclusive, representative of that interval during the horizontal sweep. Thus, the calibrating signal may take any of $2^8$ or 256 different voltage values for a given interval in order to match the input signal at that point.

The outputs on leads 174–188, inclusive, from the multiplexer unit 72 are fed to separate inputs of the D to A converter 74. The D to A converter 74 operates in the usual manner and only a single portion of it will be described in detail, it being understood that the remaining portions operate in substantially the same fashion. In one such representative portion, for example, the lead 174 is connected to the cathode of a diode 190 whose anode is connected through a resistor 192 to a positive voltage bus 194. The resistor 192, as are the other corresponding resistors in the circuit, is chosen to have a binary weighted value. The resistor 192, for example, is representative of the 7th power of 2 in binary terminology. The anode of the diode 190 is also connected to the anode of a diode 196 whose cathode is connected to an output bus 198. All of the cathodes of the diodes in the D to A converter 194 corresponding to the diode 196 are connected to the bus 198. The diode output bus 198 is connected to the negative input terminal of a differential amplifier 200.

In operation, if the output lead 174 from the multiplexer unit 72 is low, the current from the bus 194 will flow forwardly through the diode 190 and no current will flow through the diode 196 because it will thereby be given insufficient biasing to become conductive. When the output lead 174 is high, the diode 190 will be reverse biased and current from the bus 194 will forwardly bias and flow through the diode 196 via the resistor 192 to the negative input to the differential amplifier 200. In a similar fashion the other output leads 176–188, inclusive, control other diodes corresponding to the diodes 190 and 196 to supply an additive current to the diode output bus 198, which increases in stepwise fashion during the RECORD mode until it is halted by the comparator 94, and which is representative of the calibrating signal.

A pair of biasing resistors 202 and 204 are connected in series between the bus 194 and a circuit ground bus 220 to provide a voltage divider network. The anode of a diode 206 is connected to the connection between the resistors 202 and 204 and its cathode is connected to the positive input terminal of the amplifier 200 and through a resistor 208 to a negative potential bus 210. The diode 206 provides temperature compensation for the circuit. It causes the voltage level at the positive input terminal to the amplifier 200 to move with temperature, along with the negative input, by nature of the internal circuitry of the amplifier 200. The level at the negative input terminal to the amplifier 200 moves just enough to allow for changes in the diodes connecting the resistors to the bus 198 so that the voltage across the resistors remains constant.

The result of this arrangement is that there are common mode voltage changes equally effecting the output of the amplifier 200 and its positive input. The output from the amplifier 200 is fed through a resistor 212 to the negative input of a differential amplifier 214. Its positive input terminal is connected through a resistor 216 to the positive input terminal of the amplifier 200 and through a resistor 218 to the common bus 220. The differential amplifier 214 discriminates the common mode voltage changes appearing at the input and output of the amplifier 200 and supplies a DC offsetting signal on a lead 280 which goes from approximately −3.98 volts to approximately +3.98 depending upon the digital word at the input of the D to A converter 74.

Referring again more particularly to FIG. 7, the operation of the store register 94 will be explained in greater detail. When the ACCESS MEMORY and STORE buttons 58 and 60, respectively, are depressed a logic low appears on a lead 222 which is connected at one end through the switches 58 and 60 to the circuit ground. Lead 222 is connected at its other end through a resistor 224 to one input of a NAND gate 226. The output of the NAND gate 226 is supplied to one input of a NAND gate 228 whose output is returned to the other input of the NAND gate 226. Thus, the NAND gates 226 and 228 are connected as a R-S (reset-set) latch. A resistor 324 is connected between a positive voltage bus 326 and the input of the NAND gate 226 to which the resistor 224 is connected. This biasing arrangement provides a logic high during the time either of the switches 58 or 60 are open. In operation, the output of the NAND gate 226 will be at a logic high when a logic low is supplied to its one input via the lead 222 and will remain high until the combination latch is reset.

The output of the NAND gate 226 is also connected to the D input of a latch 230. A T input of the latch 230 is supplied with the OSP signal which, as explained above, goes to a high at the end of a horizontal sweep on the display 38. When the T input goes high, the logic high appearing at the D input of the latch 230 is transferred to its Q output. A corresponding latch output $\overline{Q}$ (i.e. not Q, the opposite of the Q output) simultaneously changes from a logic high to a logic low. The $\overline{Q}$ output is connected to the other input of the NAND gate 228.

When the $\overline{Q}$ output changes from a high to a low at the end of the horizontal sweep, the combination latch unit made of the NAND gates 226 and 228 is reset, placing a logic low at the D input of the latch 230. The net result of this operation is to cause the Q output of the latch 230 to go to a logic high at the end of the sweep following the pressing of the STORE button and to remain high during the next sweep, that is during the recording sweep, and then to fall at the end of the recording sweep. This signal is designated the LOAD signal and is supplied to the lead 172, shown in FIG. 7, which controls the multiplexer 72 as explained above. The inverted, corresponding signal appearing at the Q output of the latch 230 is designated the LDBN signal and is supplied to the memory unit 70 to control the recirculation of stored data in the shift registers. The LOAD signal is also supplied to one input of the NAND gate 118 whose other input is supplied with the output of the clock pulse generator 64. The LOAD signal to the NAND gate 118 is thus an enabling signal which allows the successive approximation process and memorization process to take place under the partial control of the clock pulse generator 64 as described above.

Referring again to FIG. 7, the scale selectivity switch unit 62, the RANGE register 84 and the LOGIC CONTROLLED ATTENUATOR 76 will be described in greater detail. The dB/DIV selectivity scale circuit 62 includes an inverter 352 whose output supplies a logic signal $S_2$ and whose input is connected to the circuit ground through a ".1 dB/DIV" pushbutton switch 62a. The input to the inverter 352 is also connected through a resistor 354 to a positive voltage bus 356. The effect of this arrangement is that the output $S_2$ of the inverter 352 will be a logic low unless the switch 62a is closed in which case the output $S_2$ will then become a logic high.

The selectivity scale switch unit 62 further includes a NAND gate 358, one of whose inputs is connected to the circuit ground through a pushbutton "1dB/DIV" switch 62b and through a resistor 360 to the positive voltage bus 356. The other input of the NAND gate 358 is connected to the circuit ground through a pushbutton "10dB/DIV" switch 62c and to the positive voltage bus 356 through a resistor 362. The output of the NAND gate 358 is passed through an inverter 364 to become the logic signal $S_0$. The resistors 360 and 362 normally supply logic highs to the inputs of the NAND gate 358 so that its output is normally a logic low and the inverter 364 output $S_0$ is a logic high. When either of the switches 62b or 62c is closed, the corresponding input to the NAND gate 358 is a logic low and the signal $S_0$ becomes a logic low.

Unit 62 further includes a NAND gate 366 having one of its inputs connected through the resistor 362 to the positive voltage bus 356. The other input of the NAND gate 366 is connected through a pushbutton 5dB/DIV switch 62d to the circuit ground and through a resistor 368 to the positive voltage bus 356. The output of the NAND gate 366 is a logic signal $S_1$. The signal $S_1$ is normally a logic low and becomes a logic high when either of the switches 62c or 62d are closed. At the .5dB/DIV setting, all of the switches 62a–62d, inclusive, are open.

The signals $S_0$, $S_1$, and $S_2$ are fed to the switched-gain amplifier 90 to control the scale factor and are also fed to separate inputs of the range register 84 as illustrated in FIG. 7. The leads carrying the signals $S_2$, $S_0$ and $S_1$ are supplied to the D inputs of latches 232, 234 and 236, respectively. The T inputs of the latches 232, 234 and 236 are connected in common to the LOAD line 172. The signals $S_2$, $S_0$ and $S_1$ appearing at the D inputs of the latches 232–236, inclusive, are transferred to the outputs of the latches when the LOAD lead 172 goes high during the recording process, and remain there until the next recording process.

The output $\overline{Q}$ of the latch 232 represents the inverse of the input signal $S_2$ when this transfer takes place. This $\overline{Q}$ output is supplied through a resistor 238 to the emitter electrode of a PNP transistor 240 whose base is grounded and whose collector electrode is connected through a resistor 242 to the gate electrode of the FET 244. The gate electrode of the FET 244 is also connected through a resistor 246 to a −15 volt bus supply 248.

The Q output of the latch 234 corresponds to the signal $S_0$ upon transfer and is supplied through a resistor 250 to the emitter electrode of a PNP transistor 252 whose base is grounded and whose collector electrode is connected through a resistor 254 to the gate electrode of a FET 256. The gate electrode of the FET 256 is also connected through a resistor 258 to the negative supply bus 248. The $\overline{Q}$ output of the latch 234 is the inverse of its Q output and is supplied through a resistor 260 to the emitter electrode of a PNP transistor 262 whose base is grounded and whose collector electrode is connected through a resistor 264 to the gate electrode of an FET 266. The gate electrode of the FET 266 is connected to the negative supply bus 248 through a resistor 268.

The $\overline{Q}$ output of the latch 236 corresponds to the inverse of the signal $S_1$ upon transfer and is supplied through a resistor 270 to the emitter electrode of a PNP transistor 272 whose base electrode is grounded and whose collector electrode is connected through a resistor 274 to the gate electrode of an FET 276. The gate electrode of the FET 276 is connected through a resistor 278 to the negative supply bus 248.

The output from the D to A converter 74, and more particularly the output from the amplifier 214, appears on a lead 280 which is connected through a resistor 282 to a junction point 284. The junction point 284 is connected through a resistor 286 to the drain electrode of the FET 276, through a resistor 288 to the drain electrodes of the FET's 256 and 266, and through a resistor 290 to the drain electrode of the FET 244. The junction point 284 is also connected through a resistor 292 to the drain electrode of an FET 294 and the source electrodes of the FET's 244 and 266. The source electrodes of the FET's 256 and 276 are connected to the circuit ground. The source electrode of the FET 244 constitutes the output of the LOGIC CONTROLLED ATTENUATOR and this output is supplied through FET 294 to the offset amplifier via a lead 296. The FET 294 constitutes a portion of the MEMORY ON-OFF CIRCUIT 78 depicted in FIG. 5, and will be described in further detail hereinafter.

The PNP transistors 240, 252, 262, 272 and the FET's 244, 266, 256 and 276 make up the LOGIC CONTROLLED ATTENUATOR 76. Minimum attenuation occurs when the FET's 244 and 266 are conductive and all other FET switches are non-conductive. This occurs on the 10 dB/DIV setting. Attenuation increases by a factor of two when the FET 256 becomes conductive and the FET 266 becomes non-conductive. This occurs at the 5 dB/DIV, .5 dB/DIV and .1 dB/DIV settings. Attenuation increases by a factor of ten when the FET 276 becomes conductive and this happens on all ranges more sensitive than 5 or 10 dB/DIV. Attenuation increases by an additional factor of five when the FET 244 becomes non-conductive at the .1 dB/DIV range. Each attenuation factor is independant of the others and more than one part of the attenuator 76 may be in use at any one time.

A similar drive circuit controls the FET 294 which operates as an on-off switch. When the FET 294 is conductive, the signal from the attenuator is connected to the offset summing point via a lead 296. Corrections from the memory in the form of a calibrating signal are then subtracted in the offset amplifier 80 as described previously. The FET 294 is conductive when the device is operating in the MEMORY, INPUT MINUS MEMORY, or RECORDING modes. The FET 294 is made conductive by means of a logic circuit to be described.

The gate electrode of the FET 294 is connected through a resistor 298 to the collector electrode of a PNP transistor 300 and through a resistor 302 to the negative supply bus 248. The base electrode of the transistor 300 is grounded and its emitter electrode is connected through a resistor 304 to the output of a NAND gate 316. The input to the NAND gate 306 is connected to the $\overline{Q}$ output of the latch 230. The other input of the NAND gate 306 is connected to the output of an inverter 308 whose input is supplied from the output of a NAND gate 310. One input of the NAND gate 310 is connected through a resistor 312 to a lead 314 which connects through the INPUT MINUS MEMORY switch 54 to the circuit ground. The other input of the NAND gate 310 is connected through a resistor 316 to a lead 318 which is connected through the MEMORY switch 56 to the circuit ground. The depression of the switches 54 or 56 causes a logic low on the leads 318 or 314, respectively. The NAND gate 310, the inverter 308 and the NAND gate 306 are connected to make a three input NAND gate whose output (referenced DAON) is high for the three conditions when the FET 294 should be conductive, that is, during the MEMORY, INPUT MINUS MEMORY or RECORDING modes. The DAON signal is supplied to the input of the NAND gate 166 depicted in FIG. 8 for controlling the operation of the multiplexer as described above.

At all times when the switches 54, 56, 58 and 60 are not depressed, the inputs to the NAND gate 310 are logic highs because they are supplied with a positive voltage through the resistors 320 and 322 which are connected to the +5 volt bus 326. Likewise, one of the inputs to the NAND gate 226 is connected to the positive bus 326 through a resistor 324.

In the MEMORY DISPLAY mode, the contents of the memory are fed directly to the output amplifier 96 and the MEMORY DISPLAY on/off switch unit 56 is needed to control this operation. To accomplish this, the lead 280 which carries the D to A converter 74 output is connected through a resistor 328 to the drain electrode of a FET 330 whose source electrode is connected via a lead 281 to the negative input of the output amplifier 96. The reason it is connected to the negative input is that the calibrating signal from the D to A converter 74 is opposite in polarity to the input signal and thus must be "subtracted" before being displayed in order to reverse its polarity and give a proper display. The gate electrode of the FET 330 is connected through a resistor 332 to the collector electrode of a PNP transistor 334 and through a resistor 336 to the base electrode of a NPN transistor 338. The base electrode of the transistor 338 is connected through a resistor 340 to the negative supply bus 248. The emitter electrode of the transistor 338 is also connected to the negative supply bus 248. The collector electrode of the transistor 338 is connected to a control line 344 which supplies a disabling signal to a FET (not shown) in the output amplifier 96 to disconnect all its inputs other than the input connected to the output of the digital to analog converter 74 during the MEMORY mode.

The emitter electrode of the transistor 334 is connected through a resistor 346 to a positive voltage source and through a resistor 348 to the circuit ground. The base electrode of the transistor 334 is connected through a resistor 350 in series with resistor 316 to the MEMORY lead 318. Thus, when the MEMORY button switch 56 is depressed, the base electrode of the transistor 334 is put substantially at ground potential causing it to become conductive which, in turn, forward biases the gate electrode of the FET 330 causing it to become conductive and to supply the output from the D to A converter on lead 280 to the negative input of the output amplifier 96 on lead 281.

In summary, during the RECORD mode the instrument of the present invention, at each of a plurality of different intervals during the horizontal sweep period of the display, generates an offsetting calibrating signal whose magnitude increases rapidly in stepwise fashion until it nulls the input signal (converted to dB form) from the test circuit alone. The calibrating signals are supplied from a D to A converter and the digital instruction to the D to A converter needed to generate the nulling value of the calibrating signal at each of the intervals during the horizontal sweep is entered into a digital memory for later recall. Subsequently, the calibrating signal for each interval is automatically generated by recalling the digital instructions to the D to A converter from the memory. These calibrating signals are substracted from the input signal (in dB form) to give a normalized display.

Unlike any prior art instrument of this type, the calibrating signal can be selectively amplified by a scale factor prior to being stored and upon recall it is automatically attenuated by the same factor so that the resultant difference of the calibration signal and the dB level input signal may be displayed at a different scale factor. The attenuation scale factor information is stored in a digital memory during the RECORD mode. Another novel feature of the invention is that the horizontal sweep frequency can be readily changed after memorization of the calibrating signal since the INC pulse generator is controlled by the horizontal sweep rate.

In the above description, certain logic and amplifier circuits are referred to generally and are not described in detail since their construction is well-known to those skilled in the art. Furthermore, the various biasing connections necessary to enable these circuits to operate are shown in some instances but are not described in detail since their arrangement is also well-known to those skilled in the art.

While the above described measuring instrument has a particular application in swept frequency measurement systems, it should be apparent that it has applications in numerous other fields as well. For example, in operations where it is desired to cancel out a continuous signal portion from a composite signal so that a more accurate reading can be made of a variable signal portion of the composite signal, the continuous signal portion may be stored in the memory circuit as described above and then subtracted out from the composite signal during subsequent measurements.

The terms and expressions which have been employed here are used as terms of description and not of limitation, and there is no intention, in the use of such terms and expressions, of excluding equivalents of the features shown and described, of portions thereof, it being recognized that various modifications are possible within the scope of the invention claimed.

What is claimed is:

1. In a system for measuring the variations of magnitude of a test signal over a period of time, a corrector for eliminating recurrent error signals comprising:
   input means for receiving the error signals;
   a clock pulse generator;
   means responsive to the output of the clock pulse generator for generating a recurrent cycle of calibrating signals whose magnitudes increase in stepwise fashion beginning from an initial level below the highest expected level of the error signal;
   means for repeatedly comparing, at a plurality of discrete intervals during the time period, the magnitudes of the calibrating and error signals and for halting the increase in magnitude of the calibrating signal when the difference of the magnitudes of the calibrating signal and the error signal is within a predetermined range;
   means for storing the magnitude of the halted calibrating signal at each discrete interval; and
   means for displaying with respect to each discrete interval during a subsequent time period the difference in magnitudes between the test signal and the calibrating signal value stored at that discrete interval.

2. An error corrector for use in a system for measuring the response signal characteristics of a test device in a test circuit to a first signal during a predetermined period of time comprising:
- input means for receiving an input signal generated by the test circuit alone in response to the first signal;
- a clock pulse generator;
- means responsive to the output of the clock pulse generator for generating a recurrent cycle of calibrating signals whose magnitudes increase in an ordered fashion beginning from an initial level below the highest expected level of the input signal;
- means for repeatedly comparing, at a plurality of discrete intervals during the time period, the magnitudes of the calibrating and input signals and for halting the increase in magnitude of the calibrating signal when the difference of the magnitudes of the calibrating signal and the input signal is within a predetermined range;
- means for storing the magnitude of the halted calibrating signal at each discrete interval; and
- means for displaying with respect to each discrete interval during a subsequent time period the difference between the response signal characteristic of the test device in the test circuit to the first signal and the calibrating signal value stored at that discrete interval.

3. An error corrector for use in a system for measuring the response signal characteristics of a test device in a test circuit to a first signal during a predetermined period of time comprising:
- input means for receiving an input signal generated by the test circuit alone in response to the first signal;
- a clock pulse generator;
- means responsive to the output of the clock pulse generator for generating a recurrent cycle of calibrating signals of opposite polarity whose absolute magnitudes increase in stepwise fashion beginning from an initial level below the highest expected level of absolute magnitude of the input signal;
- means for producing an output signal representative of the sum of the calibrating and input signals;
- means for selectively multiplying the sum signal by one of a plurality of predetermined scale factors;
- means for repeatedly comparing, at a plurality of discrete intervals during the time period, the magnitude of the scaled, sum signal to a reference value and for halting the increase in magnitude of the calibrating signal when the difference of the magnitudes of the scaled, sum signal and the reference value is within a predetermined range;
- means for storing the magnitude of the halted calibrating signal at each discrete interval;
- attenuation means for attenuating the stored calibrating signal by one of the plurality of predetermined factors, and memory means for storing a signal representative of the one attenuation factor during storage of the halted compensating signal and for subsequently controlling the attenuation means in accordance with the one stored attenuation factor; and
- means for displaying with respect to each discrete interval during a subsequent time period the difference between the response signal characteristic of the test device in the test circuit to the first signal and the attenuated calibrating signal value stored at that discrete interval.

4. A system for measuring the response signal characteristics of a test device in a test circuit to a first signal whose frequency is swept over a range during a predetermined period of time comprising:
- input means for receiving an input signal generated by the test circuit alone in response to the first signal and for converting the input signal into an equivalent dB level signal;
- a clock pulse generator;
- controllable means responsive to the output of the clock pulse generator for generating a recurrent cycle of calibrating signals of opposite polarity to the dB level signal and each of whose absolute magnitudes increases in an ordered fashion beginning from an initial level below the highest expected level of the dB level signal;
- controllable attenuation means for attenuating the calibrating signals by one of a plurality of scale factors;
- means for producing a first output signal corresponding to the sum of the attenuated calibrating signal and the dB level signal;
- switched gain means for selectively amplifying the first output signal by one of the plurality of scale factors and for producing a second output signal;
- means for repeatedly comparing, at a plurality of discrete intervals during the time period, the magnitude of the second output signal to a reference value and for halting the increase in magnitude of the calibrating signal when the difference of the magnitude of the second output signal and the reference value is within a predetermined range;
- means for storing the magnitude of the halted calibrating signal at each discrete interval; and
- means for displaying with respect to each discrete interval during a subsequent time period the difference between the calibrating signal value stored at that discrete interval and the dB level signal corresponding to the response characteristic of the test device in the test circuit to the first signal.

5. A measuring system as recited in claim 4 further comprising memory means for storing a control signal representative of the switched gain means scale factor during storage of the halted calibrating signal and for thereafter controlling the scale factor of the attenuation means in accordance with the stored scale factor control signal.

* * * * *